United States Patent
Co et al.

(10) Patent No.: US 10,552,929 B2
(45) Date of Patent: Feb. 4, 2020

(54) FACILITATION OF ACCRUAL BASED PAYMENTS BETWEEN COUNTERPARTIES BY A CENTRAL COUNTERPARTY

(71) Applicant: Chicago Mercantile Exchange Inc., Chicago, IL (US)

(72) Inventors: Richard Co, Chicago, IL (US); Timothy McCourt, Chicago, IL (US); Thomas Rafferty, Chicago, IL (US); John Kerpel, Chicago, IL (US); David Boberski, Westport, CT (US); Edward M. Gogol, Chicago, IL (US); John Wiley, New York, NY (US); Steve Youngren, Elgin, IL (US); John Labuszewski, Westmont, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 204 days.

(21) Appl. No.: 15/266,630

(22) Filed: Sep. 15, 2016

(65) Prior Publication Data
US 2017/0004592 A1 Jan. 5, 2017

Related U.S. Application Data

(63) Continuation-in-part of application No. 15/079,266, filed on Mar. 24, 2016, which is a continuation of
(Continued)

(51) Int. Cl.
*G06Q 40/04* (2012.01)
*G06Q 40/00* (2012.01)
(Continued)

(52) U.S. Cl.
CPC .......... *G06Q 50/188* (2013.01); *G06Q 20/10* (2013.01); *G06Q 40/00* (2013.01); *G06Q 40/04* (2013.01)

(58) Field of Classification Search
CPC .................................................... G06Q 40/00
(Continued)

(56) References Cited

U.S. PATENT DOCUMENTS

| 5,297,031 A | * | 3/1994 | Gutterman | G06Q 40/04 705/37 |
| 5,915,245 A | * | 6/1999 | Patterson, Jr. | G06Q 20/32 340/4.5 |

(Continued)

OTHER PUBLICATIONS

David Boberski, "Zero Coupon Interest Rate Swap Futures Overview", CME Group, Jun. 2009, 2 pages.
(Continued)

*Primary Examiner* — Kirsten S Apple
(74) *Attorney, Agent, or Firm* — Lempia Summerfield Katz LLC

(57) ABSTRACT

A system for moving money between accounts of traders by a central counterparty to facilitate a plurality of payments, i.e. the movement of funds, there between is disclosed which provides a flexible mechanism which supports simpler accounting, new types of derivatives contracts as well new types fees. The disclosed futures contract, referred to as a "payor" contract, comprises a "no-uncertainty" futures contract, i.e. the initial value and settlement value parameters are defined, that leverages the mechanisms of the clearing system to, for example, accommodate related payments. Accordingly, a 1-to-many relationship between contracts and prices is provided whereby each price component may be assigned its own payor contract. The function of the payor contract may be to guarantee the movement of money from related positions. In one embodiment, payor contracts are dynamically created whenever a payment is needed.

23 Claims, 7 Drawing Sheets

Related U.S. Application Data application No. 13/162,821, filed on Jun. 17, 2011, now Pat. No. 9,460,468.

(60) Provisional application No. 62/320,148, filed on Apr. 8, 2016.

(51) Int. Cl.
*G06Q 50/18* (2012.01)
*G06Q 20/10* (2012.01)

(58) Field of Classification Search
USPC .......................................................... 705/35
See application file for complete search history.

(56) References Cited

U.S. PATENT DOCUMENTS

| | | | | |
|---|---|---|---|---|
| 6,161,099 A * | 12/2000 | Harrington | ............ | G06Q 30/08 705/36 R |
| 6,321,212 B1 * | 11/2001 | Lange | .................... | G06Q 40/00 705/35 |
| 6,345,090 B1 * | 2/2002 | Walker | .................... | G06Q 10/02 379/114.03 |
| 6,421,653 B1 * | 7/2002 | May | ........................ | G06Q 30/08 705/36 R |
| 6,493,683 B1 * | 12/2002 | David | .................... | G06Q 20/02 705/37 |
| H002064 H * | 5/2003 | Buchalter | ........................ | 705/37 |
| 6,629,081 B1 * | 9/2003 | Cornelius | .............. | G06Q 20/04 705/30 |
| 6,659,861 B1 * | 12/2003 | Faris | ........................ | A63F 13/12 463/1 |
| 6,732,161 B1 * | 5/2004 | Hess | ...................... | G06Q 30/06 709/219 |
| 6,768,981 B2 * | 7/2004 | Patterson, Jr. | .......... | G06Q 40/00 705/35 |
| 6,892,186 B1 * | 5/2005 | Preist | .................... | G06Q 30/08 705/26.3 |
| 6,952,682 B1 * | 10/2005 | Wellman | ................ | G06Q 30/08 705/1.1 |
| 7,007,076 B1 * | 2/2006 | Hess | .................... | G06F 12/0223 705/37 |
| 7,376,614 B1 | 5/2008 | Scheinberg et al. | | |
| 2005/0216387 A1 | 9/2005 | Barany et al. | | |
| 2007/0118453 A1 | 5/2007 | Bauerschmidt et al. | | |
| 2007/0239589 A1 | 10/2007 | Wilson, Jr. et al. | | |
| 2008/0114702 A1 * | 5/2008 | Hawrysz | ................ | G06Q 40/00 705/36 R |
| 2008/0120144 A1 | 5/2008 | Bartell et al. | | |
| 2009/0177571 A1 | 7/2009 | Gogol et al. | | |
| 2009/0313162 A1 | 12/2009 | Flory et al. | | |
| 2010/0094744 A1 | 4/2010 | Van Slyke et al. | | |
| 2011/0022539 A1 * | 1/2011 | Joenk | .................... | G06Q 40/00 705/36 R |
| 2012/0323764 A1 * | 12/2012 | Boberski | ................ | G06Q 40/00 705/39 |
| 2015/0106252 A1 * | 4/2015 | Labuszewski | ......... | G06Q 40/00 705/37 |
| 2015/0106255 A1 * | 4/2015 | Labuszewski | ......... | G06Q 40/00 705/37 |
| 2015/0112845 A1 * | 4/2015 | Labuszewski | ......... | G06Q 40/04 705/37 |
| 2015/0379642 A1 | 12/2015 | Tagliani et al. | | |

OTHER PUBLICATIONS

International Preliminary Report on Patentability in PCT/US2012/039246, dated Dec. 17, 2013, 12 pages.
International Search Report and Written Opinion in PCT/US2012/039246, dated Aug. 3, 2012, 13 pages.

\* cited by examiner

FACILITATION OF ACCRUAL BASED PAYMENTS BETWEEN COUNTERPARTIES BY A CENTRAL COUNTERPARTY

REFERENCE TO RELATED APPLICATIONS

This application is a continuation-in-part of U.S. patent application Ser. No. 15/079,266 filed Mar. 24, 2016 which is a continuation of U.S. patent application Ser. No. 13/162,821 filed Jun. 17, 2011, the entirety of both which are hereby incorporated by reference.

This application claims the benefit of the filing date under 35 U.S.C. § 119(e) of U.S. Provisional Application Ser. No. 62/320,148 filed Apr. 8, 2016, which is hereby incorporated by reference in its entirety.

BACKGROUND

Futures Exchanges, referred to herein also as an "Exchange", such as the Chicago Mercantile Exchange Inc. (CME), provide a marketplace where futures and options on futures are traded. Futures is a term used to designate all contracts covering the purchase and sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. Each futures contract is standardized and specifies commodity, quality, quantity, delivery date and settlement. Cash Settlement is a method of settling a futures contracts by cash rather than by physical delivery of the underlying asset whereby the parties settle by paying/receiving the loss/gain related to the contract in cash when the contract expires.

Typically, the Exchange provides a "clearing house" which is a division of the Exchange through which all trades made must be confirmed, matched and settled each day until offset or delivered. The clearing house is an adjunct to the Exchange responsible for settling trading accounts, clearing trades, collecting and maintaining performance bond funds, regulating delivery and reporting trading data. Essentially mitigating credit. Clearing is the procedure through which the Clearing House becomes buyer to each seller of a futures contract, and seller to each buyer, also referred to as a "novation," and assumes responsibility for protecting buyers and sellers from financial loss by assuring performance on each contract. This is effected through the clearing process, whereby transactions are matched. A clearing member is a firm qualified to clear trades through the Clearing House.

As an intermediary, the Exchange bears a certain amount of risk in each transaction that takes place. i.e. the Exchange assumes counterparty credit risks in each transaction by inserting its clearing house as the counterparty to both sides of the transaction. To that end, risk management mechanisms protect the Exchange via the Clearing House. The Clearing House establishes clearing level performance bonds (margins) for all Exchange products and establishes minimum performance bond requirements for customers of Exchange products. A performance bond, also referred to as a margin, is the funds that must be deposited by a customer with his or her broker, by a broker with a clearing member or by a clearing member with the Clearing House, for the purpose of insuring the opposing clearing broker, its customer or Clearing House against loss on open futures or options contracts. This is not a part payment on a purchase. The performance bond helps to ensure the financial integrity of brokers, clearing members and the Exchange as a whole. The Performance Bond to Clearing House refers to the minimum dollar deposit which is required by the Clearing House from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e. a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The accounts of individual members, clearing firms and non-member customers doing business through the Exchange must be carried and guaranteed to the Clearing House by a clearing member. As mentioned above, in every matched transaction executed through the Exchange's facilities, the Clearing House is substituted as the buyer to the seller and the seller to the buyer, with a clearing member assuming the opposite side of each transaction. The Clearing House is an operating division of the Exchange, and all rights, obligations and/or liabilities of the Clearing House are rights, obligations and/or liabilities of the Exchange. Clearing members assume full financial and performance responsibility for all transactions executed through them and all positions they carry. The Clearing House, dealing exclusively with clearing members, holds each clearing member accountable for every position it carries regardless of whether the position is being carried for the account of an individual member, for the account of a non-member customer, or for the clearing member's own account. Conversely, as the contra-side to every position, the Clearing House is held accountable to the clearing members for the net settlement from all transactions on which it has been substituted as provided in the Rules.

DETAILED DESCRIPTION OF THE DRAWINGS AND PRESENTLY PREFERRED EMBODIMENTS

Figure 1:
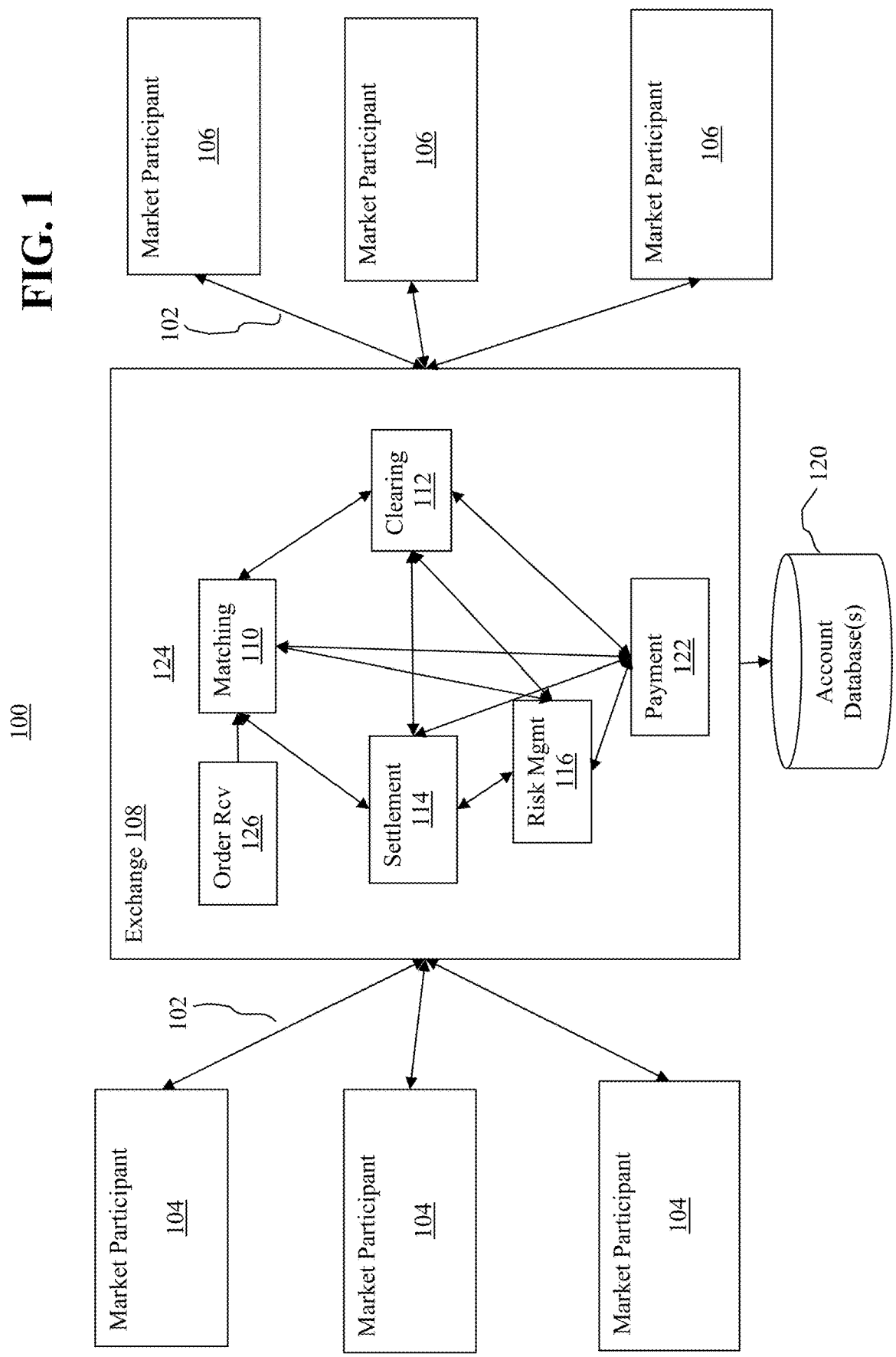
FIG. 1 shows a block diagram of an exemplary network for trading futures contracts, including in which payor contracts may be implemented, according to one embodiment.

A system for moving money between accounts of traders by a central counterparty to facilitate payments, i.e. the movement of funds, there between is disclosed which provides a flexible mechanism which supports simpler accounting, new types of derivatives contracts as well as new types of fees. As was discussed above, in futures contract clearing, a margin account offsets losses or gains related to the price change of a contract. If a trader's contract price increases or decreases, the change in value is reflected in the margin account. In fact, generally the only way to move money in or out of a margin account is by changing the price of the futures contract. This is a one-to-one relationship: one contract, one cash flow, where, for example, the same settlement price may be used for the same contract for a myriad of different position holders. Current systems, however, cannot handle related cash flows like coupons, interest on variation margin, or other periodic or occasional payments made by one trader to another while the related position remains open, e.g. a one-to-many relationship: one contract, two or more cash flows. In the over-the-counter ("OTC") market, for example, if a trader's position decreases, the trader must make a cash payment (collateral) to the prime broker account of the counterparty. An important distinction in OTC markets is that any collateral in the prime broker account of a counterparty remains the property of the trader, and thus the trader is entitled to at least one additional margin account cash flow, which is interest on the collateral. Furthermore, the profit/loss of each trade may be separately accounted for, and therefore, "personalized". Thus, a trade done based on different financing assumptions may be accounted for differently, unlike in the case of a listed futures contract. The same contract with the same underlying asset and same expiration day shares the same daily settlement price each day and thus the P/L for different trades will share the same trajectory once they are established. Current futures contract clearing systems do not support this type of payment requiring separate/external ad hoc payment and accounting mechanisms to manage.

Exchange derivative contracts having a periodic or sporadic payment from one party to the contract to the other; or, a payment between the exchange and a party to a derivatives contract, have been proposed. However, a problem with such payments is that exchange clearing systems must be coordinated with adjacent non-exchange owned and operated bookkeeping services and systems to account for and manage these related payments. So even if the exchange were to configure its systems accordingly to accommodate such periodic or other related payments, difficulties are often experienced in coordinating these capabilities with the (many) bookkeeping service providers or the (many) proprietary bookkeeping systems, such as "front-end" independent software vendors ("ISV's") and "back-end" bookkeeping services that interact with the Exchange. Thus, acceptance of novel contracts that utilize such periodic payments may be impeded.

The disclosed futures contract, referred to as a "payor" contract, comprises a "no-uncertainty" futures contract, i.e. the entire price path, e.g. the initial value and settlement value parameters, are defined and/or pre-determined and, thereby, the buyer and seller are not exposed to market risk. The disclosed payor contract leverages the mechanisms of the clearing system to accommodate, for example, a related, e.g. life cycle, payment featured by a traditional contract to which it may be paired. Accordingly, a 1-to-many relationship between contracts and prices is provided whereby each price component may be assigned its own payor contract. The function of the payor contract is to guarantee, by creating a defined and riskless position value and settlement value, the movement of money from related positions. In one embodiment, payor contracts are dynamically created whenever a payment is needed in relation to some other position held by the parties, or otherwise dynamically paired with other positions whenever a separate payment stream is required between parties, though they may be manually created in such situations as well. In addition, the traders among which the payment is to be transferred need not know of each other, the disclosed mechanism, and the central counterparty underpinnings, facilitating anonymous payments there between.

The disclosed embodiments have application with respect to a potentially wide variety of exchange traded, multi-laterally cleared derivatives contracts and have the advantage of being "implementable" by an Exchange without explicit coordination with adjacent non-exchange owned and operated bookkeeping service providers. In particular, any contract structure that contemplates a "pass-through" of monetary value for the purposes of creating a pseudo coupon payment, dividend payment, fee payment, swap payment, rolling spot interest pass-through payment, etc. may use the disclosed embodiments to effect payment.

Derivative contracts, such as those traded or cleared at CME Group, have become increasingly complex in recent years. In particular, the demand to replicate the operational requirements of over-the-counter (OTC) derivatives with their emphasis on customization has proven to be challenging. The disclosed payor contract may address these issues and difficulties, For example, consider a contract that replicates an interest rate swap ("IRS") which, typically, contemplates periodic swaps of cash calculated by reference to a fixed and a floating interest rate. It will be appreciated that such occasional payments are not a standard feature of futures contracts and are not simply a function of the daily mark-to-market ("MTM") of a futures contract by reference to the daily settlement price. Rather, standard futures contracts contemplate a single "reckoning" upon a single final settlement date.

A payor contract may be generated by an Exchange, such as CME Group, so as to flow seamlessly into adjacent private systems, including back-end bookkeeping service systems, obviating the necessity for the bookkeeping service to build out new capabilities. That is, while the Exchange, and/or Clearing House thereof, may still need to build the capability of generating payor contracts, such as on an automated basis, when these auto-generated contracts are created, they may flow into accounts that are kept in adjacent bookkeeping systems easily.

In one embodiment a payor contract may be valued on a "binary basis", referred to as a "binary option," at either $0 or $1, at the discretion of the Exchange. The "switch" may be set by the Exchange in the same way that a cash-settled futures contract is valued at a particular value on its final settlement date. Thus, an account holding a long payor contract may receive either $0 or $1 on the final settlement date of the contract. An account holding a short payor contract may receive either $0 or be obligated to pay $1 on the final settlement date of the contract.

It will be understood that a margin account offsets gains or losses related to the price change of a futures contract held by a trader. If a trader holds a "long" position (obligated to buy) on a contract for which the price increases or holds a "short" position (obligated to sell) on a contract for which the price decreases, the trader's risk of loss goes down and their margin requirement will go down which may result in funds being credited to their margin account by the clearing and margin mechanisms of the Exchange, the crediting occurring substantially simultaneously with a debiting of similar magnitude from the margin account of the trader holding the counter position. That is, for the trader holding a long position on a contract for which the price decreases or holding a short position on a contract for which the price increases, the trader's risk of loss goes up and their margin requirement will go up which may result in funds being debited from their margin account. The clearing organization of the central counter party automatically determines the daily contract settlement prices and corresponding margin requirements for the traders and automatically moves the funds as appropriate to ensure performance by the parties. In the case of a cash-settled contract, at the settlement date, the buyer and the seller may simply exchange the difference in the associated cash positions. The cash position is the difference between the current market, e.g. spot, price of the asset on the settlement date and the agreed upon price as dictated by the future contract. If the price is less than the contract price, the buyer pays the seller the difference. If the price is more than the contract price, the seller pays the buyer the difference. This cash settlement may be effected via the margin accounts of the traders as described above.

By generating payor contracts on an automated basis in particular accounts held at the Clearing House, funds may effectively be moved from one party, the "payor", to the other party, the "payee", of contracts booked on the Exchange. That is, in the case of binary payor contracts, by assigning a quantity of contracts based on the payment amount, which may be determined at, or prior to, settlement, the appropriate amount may be paid by the payor to the payee. Given the operation of the margining systems of the Exchange, this may be accomplished by valuing the position in the contracts at a zero value and then setting a non-zero value, e.g. $1 per contract, at settlement, thereby creating an increase in contract value and a gain for the long position and loss for the short position, the margining mechanisms of the Exchange automatically, or naturally, moving the appropriate funds from the account of the short trader to the account of the long trader. Conversely, the position in the contracts may be initially valued at a non-zero amount, e.g. $1, and then settled at a value of zero, thereby creating a decrease in the contract value and a loss for long position and a gain for the short position, the margining mechanisms of the Exchange automatically, or naturally, moving the appropriate funds from the account of the long trader to the account of the short trader. In either case, the initial contract value and settlement value, and assignment of corresponding long and short positions to the payor and payee, are implementation dependent. The utility of the disclosed payor contracts may be extended and applied in many other ways as described below.

It will be appreciated that construction of a payor contract as a "binary option" valued at either $0 or $1 at expiration may imply certain limitations. Consider that some systems of the Exchange or adjacent front-end or back-end systems may be limited in terms of the field size reserved in their record keeping systems or databases for quantity of futures contracts traded or held. For example, if a system is constructed to reserve 4 decimal digits, or the binary equivalent thereof, for the quantity field, the maximum number of futures contracts may be limited to 9,999. Or, if the quantity field is limited to 5 digits, the maximum quantity may be 99,999. This may be problematic if the value to be transferred is greater than $1 times that maximum quantity.

Thus, in an alternate embodiment, an "analog" payor contract may be defined instead of, or in addition to, the binary payor contract. It will be recognized that the binary payor contract is a variant of the analog payor contract in which case it need not be specifically defined. Analog payor contracts may be valued on an analog scale akin to a standard index futures contract, having a quantity, which may be greater than or equal to 1, and price associated therewith. Thus, they may be cash-settled at, for example, a multiplier $X, e.g. a pseudo quantity, multiplied by an arbitrary value or Final Settlement Price that may range from infinity ($\infty$) to negative infinity ($-\infty$). Alternatively, the multiplier may be altered, e.g. instead of establishing the multiplier at $1, it may be at $0.01, $10, $100, $1,000, $10,000, $100,000 as appropriate for the specific application. The multiplier and final settlement price may be determined based on the amount of the payment to be made and, for example, the respective record keeping fields sizes, i.e. such that the magnitude of the respective multiplier/quantity and settlement price values can be handled by the record keeping systems, e.g. to avoid overflow, and still be used to handle the expected payment amounts. It will be further appreciated that the balancing of the magnitude of the multiplier versus the magnitude of the price may vary but still achieve the same payment amount and, therefore, may be based on other factors such as the convenience of the traders in viewing, reporting and comprehending the values, etc.

For example, an analog payor contract having an initial value of zero, may be valued at $1×Final Settlement Price at settlement. The Final Settlement Price may be established at 10,000. Thus, the analog payor contract is valued at $10,000 (=$1×10,000.00). The account holding a single long position (quantity=1) in the analog payor contract may receive $10,000 while the account holding a single short position pays $10,000.

While the above examples of payor contracts facilitate a one time payment determined at the settlement date based on the specified Final Settlement Price, in another alternative embodiment, a variable payor contract may feature a variable settlement value which periodically varies until final settlement, e.g. starts with a Final Settlement Price of zero which increments with each trading period, such as daily, until the settlement date, i.e. until each intermediate and final settlement date. It will be appreciated that the initial settlement price may be set at a particular value, e.g. zero or non-zero, and be incremented and/or decremented periodically. Further, the incremental/decremental values and/or increment/decrement periods may be static or variable. In addition, the predefined, i.e. market or spot, value, the difference between it and the settlement price defining the actual payment amount or settlement value, may also increment or otherwise vary or may remain static, as described herein. For example, the predefined value may be zero.

For example, as described below, a payor contract may be defined with an initial settlement value of zero, i.e. the difference between the settlement price and the predefined value for the period is zero, and a settlement date of one year from the date the contract is created wherein the settlement price increments by 1/365 each day, in effect creating an accruing settlement value. As was described above, the margining systems of the Exchange evaluate portfolios on a periodic basis to determine the current risk of loss based on current market conditions and debit/credit a trader's margin account accordingly, referred to as variation or maintenance margin. Accordingly, as with the binary or analog payor contracts described above, the margining systems of the Exchange operates in the same manner, evaluating the variable payor contract on a daily basis to determine the gain or loss based on a defined market value with respect to the current settlement value thereof. It will be appreciated that a variable payor contract is yet another variant of the above described analog payor contract and that a similar result may be accomplished with a series, e.g. 365, of the above described binary or analog payor contracts where each is defined with a incrementing settlement date, e.g. one for each day of the year until final settlement, and the appropriate settlement value, e.g. each having a value which increases by 1/365.

Payor contracts may have many applications, such as in the context of exchange cleared interest rate swaps ("IRS") where these contracts may be used to move the "price alignment interest" ("PAI"). For example, the buyer of an IRS may be required to pay the seller a value calculated by reference to a fixed rate of interest on a periodic basis for the life of the transaction. The seller of an IRS may be required to pay the buyer a value calculated by reference to a floating or dynamic rate of interest on a periodic basis for the life of the transaction. Typically, these payments are "netted" so that gross values are not transferred but only net values. Payor contracts may be utilized to provide for such transfers of value.

Payor contracts may also be: linked with interest rate derivatives contracts for purposes of making what may essentially be regarded as coupon payments from one party of the trade to the other; linked with equity based derivatives contracts for purposes of making what may essentially be regarded as dividend payments from one party of the trade to the other; and/or used to implement rolling spot contracts which are established from time to time in the context of FX markets and are designed to price in manner similar to the spot value of a currency by requiring a, typically, daily payment that reflects the interest rate differential between the two currencies.

Alternatively, or in addition thereto, payor contracts may be used to implement fee payments, such as transaction fees. The typical exchange fee model is based on volume or turnover, i.e., when a trade is consummated, both buyer and seller pay a pre-determined exchange fee. However, futures contracts do not typically contemplate fees based on the value or notional value of the underlying instrument, which may be considered in a manner similar to a management fee typically associated with fund investments. While there have been some attempts to collect what may be regarded as a form of management or holding fee in the context of CME TRAKRS, i.e. non-traditional futures contracts designed to provide customers with a cost-effective way to invest in a broad-based index of stocks, bonds, currencies or other financial instruments avoiding, for example, the need for a portfolio manager and potential adverse tax consequences, and some over-the-counter commodity indexes listed on CME Group facilities, these products and this fee system required complex programming and coordination with back-end bookkeeping services. Payor contracts may be created to pay these fees from an account to the account of the Exchange or possibly to other accounts held by those with rights in a particular contract or other arrangements to share in fees.

The disclosed payor contracts may be created with various nomenclature designations, e.g., coupons, dividends, rolling spot payments, swap payment, fee, etc. By attaching such nomenclature to these contracts, akin to the way that the term "E-mini S&P 500 futures" may be associated in clearing and bookkeeping systems with the ticker symbol "ES," the purpose of such payor contract may be made transparent to those examining an account statement. Likewise, payor contracts with different underlying purposes may be constructed with different contract terms and conditions as deemed most conducive to the purpose.

Figure 5:
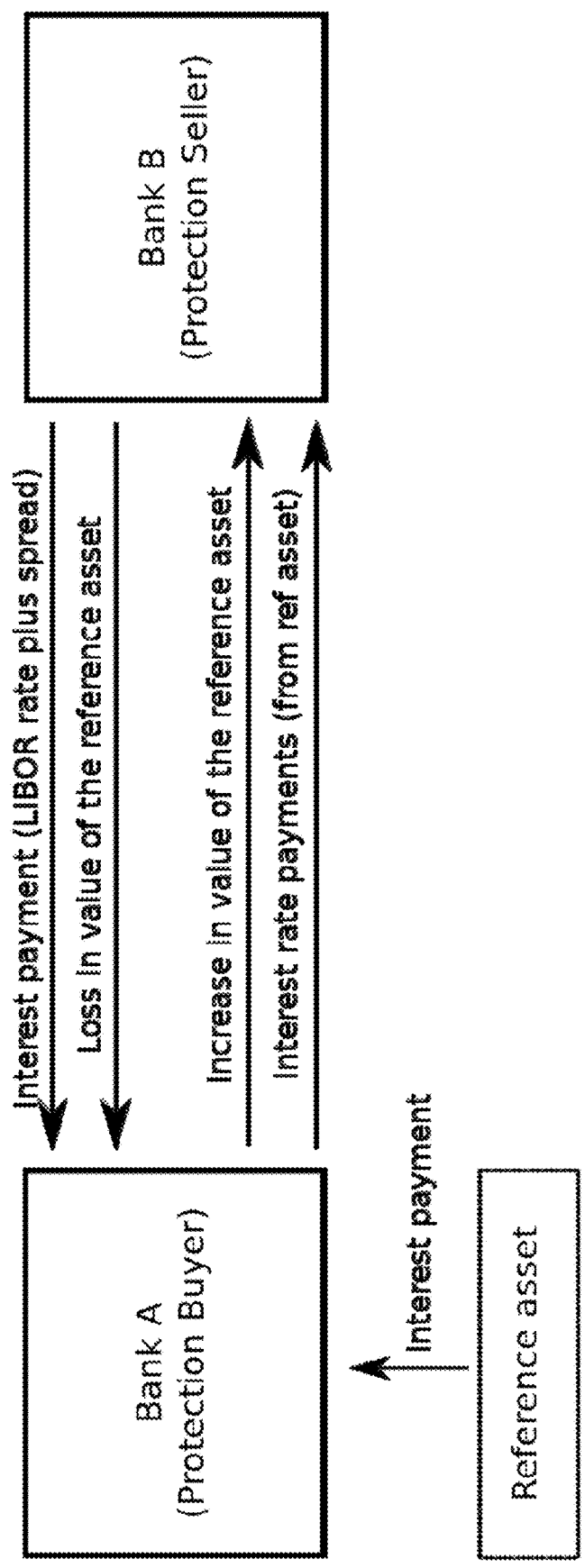
FIG. 5 shows a block diagram depicting an example total return swap.

For example, a Total Return Swap ("TRS"), also referred to as an Index Total Return Swap, is a swap agreement in which one party makes payments based on a set rate, either fixed or variable, while the other party makes payments based on the return of an underlying asset, such as shares of the S&P 500 Index, which includes both the income it generates and any capital gains. In total return swaps, the underlying asset, referred to as the reference asset, is usually an equity index, loans, or bonds. This is owned by the party receiving the set rate payment. Total return swaps allow the party receiving the total return to gain exposure and benefit from a reference asset without actually having to own it. These swaps are popular with hedge funds because they get the benefit of a large exposure with a minimal cash outlay. In a total return swap, the party receiving the total return will receive any income generated by the asset as well as benefit if the price of the asset appreciates over the life of the swap. In return, the total return receiver must pay the owner of the asset the set rate over the life of the swap. If the price of the assets falls over the swap's life, the total return receiver will be required to pay the asset owner the amount by which the asset has fallen in price. For example, as shown in FIG. 5, two parties may enter into a one-year total return swap where Party A receives LIBOR+fixed margin (2%) and Party B receives the total return of the S&P 500 on a principal amount of $1 million. If LIBOR is 3.5% and the S&P 500 appreciates by 15%, Party A will pay Party B 15% and will receive 5.5%. The payment will be netted at the end of the swap with Party B receiving a payment of $95,000 ($1 million×15%−5.5%).

An Index Futures is a futures contract on a stock or financial index. For each index, there may be a different multiple for determining the price of the futures contract. For example, the S&P 500 Index is one of the most widely traded index futures contracts in the United States; stock portfolio managers who want to hedge risk over a certain period of time often use S&P 500 futures. By shorting these contracts, stock portfolio managers can protect themselves from the downside price risk of the broader market. However, if this hedging strategy is used perfectly, the manager's portfolio will not participate in any gains on the index; instead, the portfolio will lock in gains equivalent to the risk-free rate of interest. Alternatively, stock portfolio managers can use index futures to increase their exposure to movements in a particular index, essentially leveraging their portfolios. The underlying commodity associated with an index future is a particular stock index, which cannot be traded directly. This causes futures to be the main way stock indexes can be traded, functioning and trading in the same way as other investments on the futures market. Since an index is comprised of stock from multiple companies, settlement cannot be handled through the transition of ownership of a particular stock certificate. Instead, most index futures are settled in the currency associated with the investment.

While index futures and index total return swaps serve very similar purposes, the differences in market practices will make the profit/loss path look very different. More specifically, from the point of view of a derivatives dealer who earns a profit by providing financing for customers to gain investment exposure of the index, the trajectory of its P/L is a lot more noisy if futures is used when compared with total return swap.

For example, dealer trades with customer at a financing rate of 3-Month LIBOR+30 bps. In the futures market where the dealer sell futures contract to the customer, it culminates in a futures price based on a financing rate of 3-month LIBOR+30 bps. Assuming the dealer itself has a financing rate of LIBOR, it will earn the 30 basis point (p.a.) between the inception of the trade and the expiration of the futures contract.

Following the trade however, the futures market continue to be influenced by the demand and supply of the entire market. i.e. the financing rate continue to fluctuate over the course of the futures contract.

Figure 6:
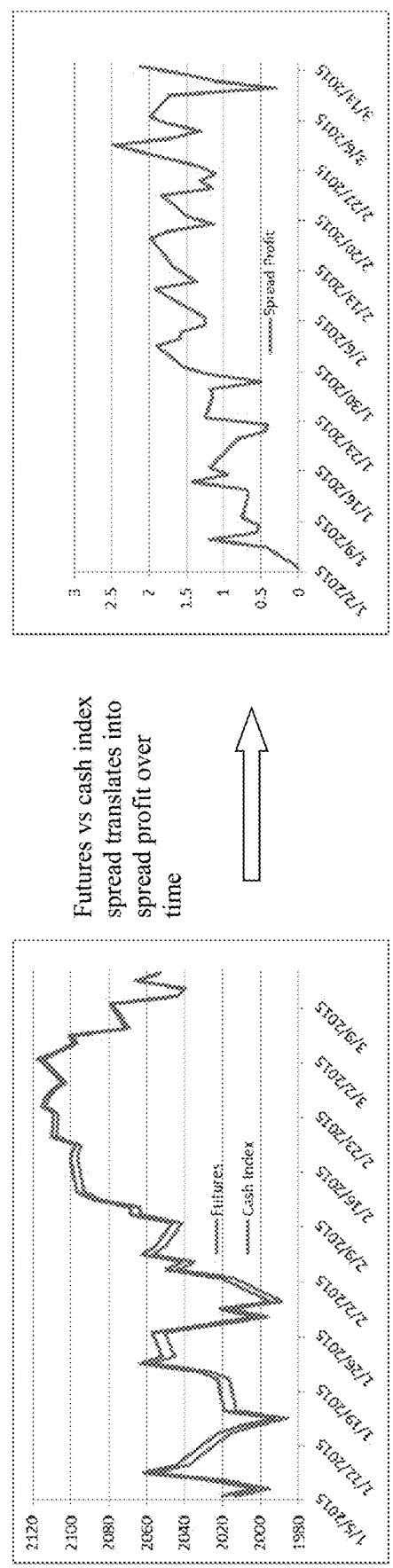
FIG. 6 shows graphs depicting earned financing spread profit according to a prior implementation that does not utilize the disclosed embodiments.

As shown in FIG. 6, the graphs (based on E-mini S&P 500 index futures, spread profit assumes 3 m LIBOR flat financing) show the financing spread profit earned by the derivatives dealer over the course of time according to a prior implementation which does not utilize the disclosed embodiments. While this financing spread profit increases with time more or less linearly, the path itself is fairly irregular/erratic. This is due to the fact that, at the end of each day, all index futures positions are marked to a single, publicly determined settlement price based on the trading of the index futures that day. As a result, the financing spread at the daily settlement time dictates the P/L of all existing positions.

This phenomenon does not exist in a TRS, where the dealer agrees to pay the customer the index performance. The customer pays the dealer financing cost, e.g. the same LIBOR+30-bps p.a., for the duration of the contract. As a result, the dealer accrues financing spread profit (i.e. the 30-bps) linearly over time.

Further, each TRS is recorded separately in the accounting books. The terms of another trade by the dealer with another customer, indeed, for that matter, all other TRS trades between any other swap counterparties, will have no bearing on the spread profit accrual. This is achieved at the expense of "fungibility", i.e. two TRS trades in opposite direction, i.e. one buy and one sell, cannot cancel each other out. They are genuinely two distinct and separate trades and are warehoused through their respective termination dates. Futures contracts, however, are fungible. Two trades in different directions offset each other immediately.

The disclosed embodiments further enable a methodology and implementation within existing futures bookkeeping system that preserves the "deal-by-deal" financing spread P/L profit but maintain the fungibility of futures positions. As used herein, such transactions will be referred to as a "synthetic Total Return Swap" or "synthetic TRS".

In particular, to implement a synthetic TRS, the disclosed embodiments may utilize a Carry Adjusted Index Futures contract ("CAIF") which establishes the trader's position in the desired reference asset, in conjunction with a variable payor contract, as described above, where the daily settlement payment varies over time, as will be described, to effect the related financing payments. This payor contract may be referred to as an Index Financing Spread Contract (IFSC). It will be appreciated that the disclosed embodiments may be implemented with other types of Index Futures Contracts where the financing component may be separated/disassociated as described herein.

The IFSC contract is set up within a futures clearing system as a normal futures contract, as described above, and thus is subject to normal variation/maintenance margin payment requirement. As will be described, once a party undertakes a position, either long or short, in and Index Futures Contract, such as the below described Carry Adjusted Index Futures contract, the necessary payor contracts to effect the related financing payments are automatically generated.

Figure 7:
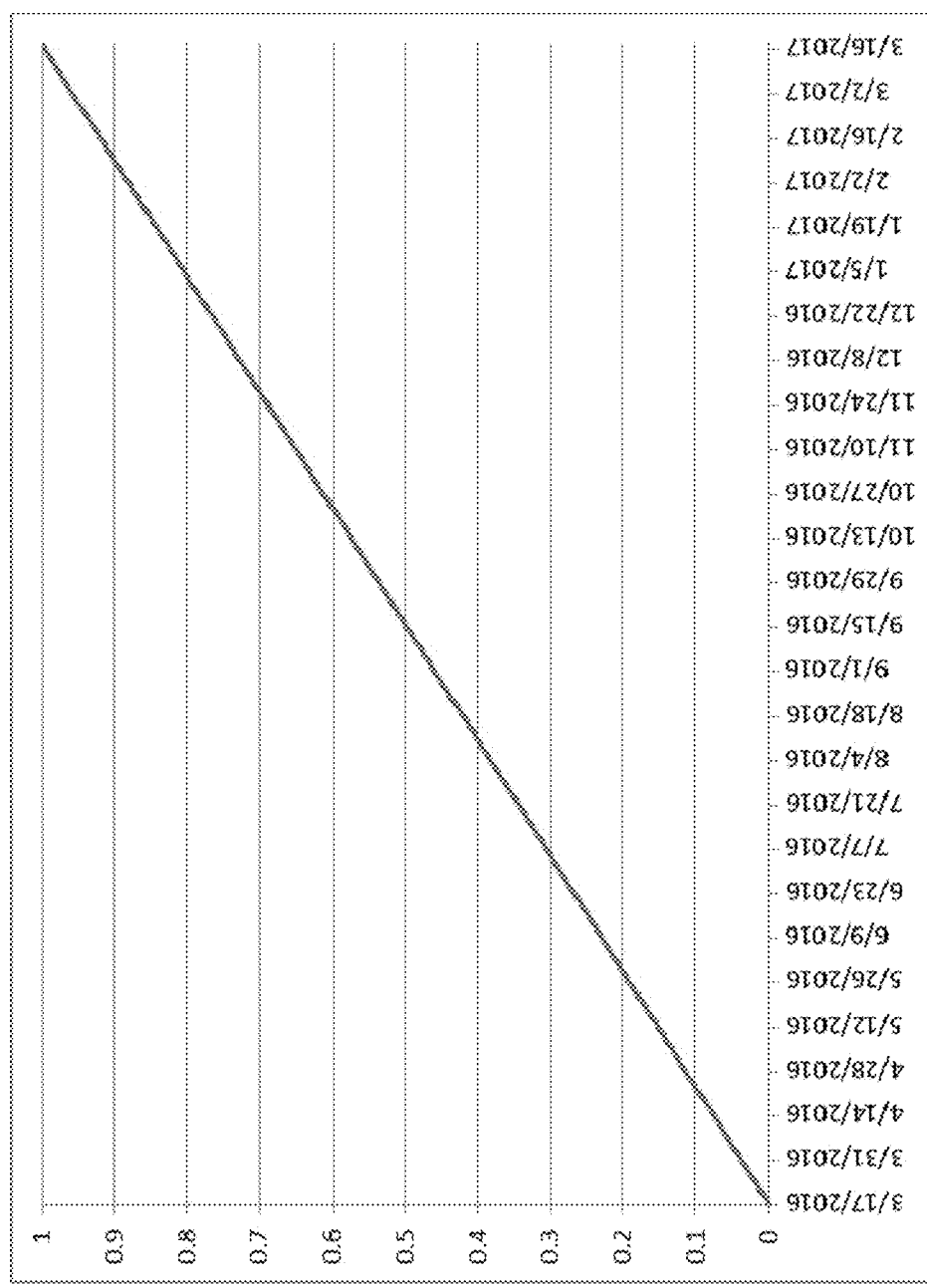
FIG. 7 shows a graph depicting the settlement price over time, from initial listing to final settlement, for an example implementation of the disclosed embodiments.

In one embodiment, a payor contract may follow the price path defined by end-points of 0 and 1 as depicted in FIG. 7. In the intervening days between the original inception date and the final settlement or expiration date, the daily settlement value is predetermined by the fraction of time elapsed between the two dates. In other words, the price path is defined by a straight line. Based on the variation settlement mechanism, the value of the contract will be incremented each day by the same amount until it reaches the expiration. As such, the short party of this contract will pay variation margin to the long party in a linear and predictable manner as it is cleared by the Clearing House. Further, this variation margin payment/receipt can be comingled with the payment or receipt of variation margin due to positions/trading of other futures positions cleared through the same clearing house.

This payor contract can then be utilized to pass through financing payment on daily basis through the variation margin system. i.e. the entirety of the financing charge is determined by the numerical multiple of contracts held. The financing payment will then be passed from the short party to the long party linearly through time via the variation margin settlement system.

In particular, the generated payor contract may behave in the following way:

The expiration, or final settlement date, of the futures is set to coincide with the expiration of index futures contract based upon which the IFSC is generated, e.g. automatically. The initial listing date of the IFSC is exactly 1 year prior to its expiration;

The initial price of the contract is 0.00. The final settlement price of the contract at the expiration is exactly 1.00. In between the initial listing and the expiration, the daily settlement price of the contract is determined by (# days since initial listing)/365×1.00. FIG. 7 shows the settlement price over time, from initial listing to final settlement; and Since this is set up as a normal futures contract in the system, the short position holder will pay variation margin everyday to the long position holder, as described above, in a linear fashion, since the price of the IFSC increases linearly over time.

On the "asset side", i.e. the index futures side, the daily settlement price is just the closing index value of the index itself. There is no need for a futures specific settlement price, as by operation of the disclosed embodiments, the "financing" is disassociated from the "asset valuation", with the former housed in the payor contract as described.

While in one embodiment, a single payor contract, as described above, is utilized with a daily settlement price which varies each day, as described, between the initial listing and the expiration, it will be appreciated that the disclosed embodiments could be alternatively implemented using a series of payor contracts, one being automatically created for each settlement period in advance or upon the occurrence of each period, e.g. daily, where the settlement price and/or settlement of each contract varies as described.

The trading of the index futures may further be modified as follows: instead of a market with prices quoted in futures index point, the market may be quoted in financing terms, e.g. −5 bps/5 bps, i.e. market buys at −5 basis points spread and market sells at 5 basis points spread, both versus benchmark interest rate. In other words, a trader seeking to transact in a synthetic TRS may construct their offer to buy or sell based on the desired underlying asset, desired quantity thereof and financing charge they are willing pay or accept. As will be appreciated, offers to buy or sell may be submitted to the Exchange whereby the Exchange, e.g. the matching engine thereof, will attempt to match the offer with a suitable previously received but unsatisfied, i.e. "resting", counter offer in the order book database of the Exchange. If a match is not found, or the order is not completely satisfied by the available quantity of an identified counter offer, data indicative of the newly received order, or remaining quantity thereof, is placed in the order book database and the availability of the offer is advertised to other market participants, e.g. via a market data feed. If a suitable counter offer is identified, the incoming order and the identified resting order are matched, to the extent they are filled by the quantities thereof, and cleared and the relevant positions are then created in each trader's portfolio. Based on the agreed upon financing charge/terms, the requisite payor/IFSC contracts are generated as described herein.

For simplicity of argument, it may be assumed that the index itself takes care of the 3-month LIBOR benchmark. See, e.g., U.S. Patent Application Publication No. 2015/0379642 A1, herein incorporated by reference in its entirety.

Further, to make the mathematics simple, a trivial assumption may be made that the index futures trade is done 1 year from the expiration of the contract, and that the cash index level at the close of business is 10,000 exactly. This simplifies the calculations as disclosed herein.

Accordingly, the buyer agrees to pay 5 bps and a trade is consummated. The trade is then split into two separate positions:

Buyer gets 1 long position in an Index Futures contract such as a "carry-adjusted index futures" with 1-year from expiration, and short 10,000×0.0005=5 IFSC with corresponding expiration (its current price is 0). (Note: 0.0005=5 bps)

Seller gets 1 short position in "carry-adjusted index futures" and 5 long positions in the IFSC, i.e. the exact opposite positions as the buyer.

These trades are all entered in the same day settlement price: for the carry-adjusted index futures, the settlement price is simply the cash index closing value, here we assumed to be 10000.

In one implementation, the carry-adjusted index futures will be marked to the its cash index closing value everyday, whereas the IFSC will be marked according to the schedule described above.

This methodology will create that linear spread profit profile for the dealer, assuming to be the seller in this example. The buyer would pay the seller, in a linear fashion, through the variation margin on the IFSC/payor contract(s) everyday based on the accrual schedule of the 5 IFSC contracts. The carry-adjusted futures will convey the index performance less the benchmark financing from the seller to the buyer. For the dealer, this will be offset by the gain/loss from his hedge portfolio. As such, the net gain for the dealer will indeed be coming from the IFSC contracts, which accrues linearly over time, and is not impacted by the current financing condition in the index futures market. It can be traded at +20 bps instead of the +5 bps at the inception of the trade. The accounting P/L would not be impacted by the current market.

While a trade currently done for a price of +20 bps would result in 1 carry-adjusted index futures and 20 IFSC exchanging hands, the settlement values of the index futures and the IFSC are not impacted.

It is to be noted:

As time marches on, the IFSC price will increase. E.g. after ¼ year, the settlement price of the IFSC will be 0.250. i.e. with ¾ year left to expiration, the short position holder in IFSC will pay the long position holder exactly 0.750 for the remainder of the term. Therefore, if the carry-adjusted index is again at 10,000, the correct number for IFSC position for a +5 bps trade is still 5 IFSC contracts as the linear increment of the IFSC price already accounts for the shortened duration of the trade.

This methodology reduces an entire portfolio of swaps (assuming all with same expiration) into just positions in these two contracts. Each swap is decomposed into these two components. Since both the carry-adjusted index futures and the IFSC are fungible, the positions would net down to just two line items.

A participant can trade out of his entire position by closing out the carry-adjusted index futures. The IFSC positions might not net out entirely as the financing condition in the market changes. However, the residual IFSC position is "riskless" in the sense that it's P/L is completely deterministic—akin to an annuity. It can either be left in the system and the residual financing spread payment made over time, or a central market can be set up for participants to buy and sell these positions for cash consideration.

Further, as long as the expiration date matches, carry-adjusted index futures based on different indexes, e.g. S&P 500, Dow Jones Industrial Average, NASDAQ-100, Russell 1000, Russell 2000, etc., can all share the same IFSC. There is no need for index specific IFSCs.

Electronic trading of the contract pair, with bid/ask spread defined as financing spread, e.g. +5 bps/+15 bps. Note that spreads can be negative.

Upon trade matching, the position is created as follows:

Carry-Adjusted index futures position traded at the closing index value of the cash index;

Long Carry-Adjusted Index futures position holder will also be assigned the following number of units of IFSC:
 −1×closing index value×0.0001×spread price traded, rounded to nearest integer
 If this number is negative, it is a short IFSC position. If it is a positive number, it is a long IFSC position
 The IFSC positions created are priced at same day settlement price for the contract Short Carry-Adjusted Index futures position holder will also be assigned the opposite position in IFSC.

In the clearing system, on a daily basis, the Carry-Adjusted index futures may be marked to market at its cash index closing value. The IFSC may be marked to market based on the predetermined accrual schedule. Variation margin is collected and dispersed.

It will be further appreciated that while a trader holds positions in the CAIF and IFSC instruments, the mechanisms of netting and offsetting may be available to the trader to reduce the overall amount of margin they must pay by entering into additional risk-offsetting positions, referred to as "offsetting," and/or extinguish one or more of the CAIF or IFSC positions by entering into counter-positions, referred to as "netting," without any effect on the trader which holds the counter positions in the CAIF and IFSC instruments. This is due to the novation process by which the Exchange acts as a central counterparty to each transaction, becoming the buyer to the seller and the seller to the buyer, and by virtue of the above described margin process which ensures the performance of each party with respect to their obligations.

While the disclosed embodiments will be described in reference to the CME, it will be appreciated that these embodiments are applicable to any Exchange, including those which trade in equities and other securities. The CME Clearing House clears, settles and guarantees all matched transactions in CME contracts occurring through its facilities. In addition, the CME Clearing House establishes and monitors financial requirements for clearing members and conveys certain clearing privileges in conjunction with the relevant exchange markets.

Referring now to FIG. 1, there is shown a block diagram of an exemplary network 100 for trading futures contracts, including in which payor contracts may be implemented, according to the disclosed embodiments. The network 100 couples market participants 104, 106, such as those entities 104 wishing or needing to make a payment, also referred to as payors, and those entities 106 to which the payment is to be made, also referred to as payees, with an exchange 108, such as the CME, also referred to as a central counterparty or intermediary, via a communications network 102, such as the Internet, an intranet or other public or private, secured or unsecured communications network or combinations thereof. The network 100 may also be part of, or alternatively coupled with a larger trading network, allowing market participants 104 106 to trade other products, such as futures contracts, options contracts, foreign exchange instruments, etc., via the exchange 108, including derivatives contracts featuring periodic or occasional payments prior to settlement. It will be appreciated that the plurality of entities utilizing the disclosed embodiments, e.g. the market participants 104, 106, may be referred to as payors, payees, lenders, borrowers, traders, market makers or by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant 104 106 and/or the exchange 108.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange 108 implements the functions of matching 110 buy/sell transactions, clearing 112 those transactions, settling 114 those transactions and managing risk 116 among the market participants 104 106 and between the market participants and the exchange 108, as well as payment functionality 122 for administering payments between payors and payees as will be described. The exchange 108 may be include or be coupled with one or more database(s) 120 or other record keeping system which stores data related to open, i.e. un-matched, orders, matched orders which have not yet been delivered, as well as payments made or owing, or combinations thereof.

Typically, the exchange 108 provides a "clearing house" (not shown) which is a division of the Exchange 108 through which all trades made must be confirmed, matched and settled each day until offset or delivered. The clearing house is an adjunct to the Exchange 108 responsible for settling trading accounts, clearing trades, collecting and maintaining performance bond funds, regulating delivery and reporting trading data. Essentially mitigating credit. Clearing is the procedure through which the Clearing House becomes buyer to each seller of a futures contract, and seller to each buyer, also referred to as a "novation," and assumes responsibility for protecting buyers and sellers from financial loss by assuring performance on each contract. This is effected through the clearing process, whereby transactions are matched. A clearing member is a firm qualified to clear trades through the Clearing House.

In the presently disclosed embodiments, the Exchange 108 assumes an additional role as the central counterparty in payment transactions, i.e., the Exchange 108, via the margin mechanisms, will become the payee to each payor and payor to each payee, and assume responsibility for protecting payees and payors from financial loss by assuring performance on each payment contract, as is done in normal futures transactions. Additionally, the Exchange 108 may further assume the role as administrator of products, i.e. derivatives contracts, which require payments, computing when a payment is due, computing the amount of the payment and automatically generating the payor contracts to effect the payment by the due date. As used herein, the term "Exchange" 108 will refer to the centralized clearing and settlement mechanisms, risk management systems, etc., as described below, used for futures trading, including the described enhancements to facilitate payment transactions. By assuming this intermediary role and employing credit screening and risk management mechanisms, derivatives contracts having periodic or occasional payments may be implemented for parties desiring such contracts. Further, additional revenue sources for the Exchange may be facilitated, such as account maintenance fees on accounts holding open futures positions.

Referring back to FIG. 1, a system 124 for facilitating one or more payments between a first trader 104 and a second trader 106 by a central counterparty 108 which requires the first and second traders 104 106 to each maintain associated accounts in which funds are deposited to cover trading losses. The system includes an account database 120 stored in a memory 404 discussed below with reference to FIG. 4, the account database 120 comprising a first account record associated with the first trader 104 which includes data reflecting funds maintained on account to cover trading losses by the first trader 104, and a second account record associated with the second trader 106 which includes data reflecting funds maintained on account to cover trading losses by the second trader 106.

The system 124 further includes a payment processor 122 coupled with the database 120, or memory 404 storing it, and operative to determine the amount of a payment to be made from one of the first or second trader 104 106 to the other of the first or second trader 104 106 at one or more settlement dates, such as based on a first position in a first instrument held by the first trader to which the second trader is a counter-party or otherwise holds a counter-position, wherein the payment processor is further operative to assign the first trader 104 a second position in one or more futures contracts characterized by the one or more settlement dates, a quantity and one or more prices, the second position being characterized by a value based on the quantity and the price of each of the one or more futures contracts as of the assignment, and assign the second trader 106 a third position, counter to the second position, in the one or more futures contracts, the first and second traders not being identified to each other. In one embodiment, the payment processor 122 is operative to determine the payment amount upon occurrence of each of the one or more settlement dates. Alternatively, the payment amount is determined in advance of the one or more settlement dates.

As described above, the one or more futures contracts may comprise a single futures contracts with multiple, intermediate, settlements dates, each with a different settlement price, or may comprise multiple futures contracts each having a different final settlement date and final settlement price. For example, a single futures contract having a final settlement date of 1 year from creation, daily settlement and a settlement price which increments daily from zero by increments of 1/365 may be created, or may be each business day based on a 1/365 increment, etc. Alternatively, 365 futures contracts may be generated, each having a daily incremental settlement date and settlement value associated therewith which increments by 1/365 as compared to the previously settled futures contract. It will be appreciated that one instrument having its settlement value increment by a defined amount over a series of settlement periods, e.g. $0-$5 incremented by $1 daily, will have the same effect as a set of individual instruments, one for each settlement period, e.g. each day of the 5 day period, each having a defined settlement value equal to the defined increment, e.g. $1, that is, a total of $5 over 5 days. In the case of a single futures contract, it will be appreciated that the intermediate settlement dates may, in fact, be defined by the Exchange based on the Exchange's periodic calculation of variation margin for a given portfolio, e.g. daily or each business day.

The system 124 further includes a settlement processor 114 coupled with the database 120, or memory 404 storing it, and operative to value, upon occurrence of each of the one or more settlement dates, each of the one or more futures contracts at a predefined value, e.g. a pre-defined spot or market value, different from the associated settlement price of the futures contract for the settlement date, the difference being based on the determined payment amount.

In addition, the system 123 includes a margin processor 116 coupled with the settlement processor 114 and the database 120, or memory 404, and operative to modify the first and second account records in the account database to reflect a credit to the account of the first trader 104 and a debit from the account of the second trader 106 in the amount of the difference between the value of the second position and the predefined value when the difference represents a loss for the second trader 106, and modify the first and second account records in the account database to reflect a debit from the account of the first trader 104 and a credit to the account of the second trader 106 in the amount of the difference between the value of the second position and the predefined value when the difference represents a loss for the first trader 104.

In one embodiment, the payment processor 122 may be further operative to automatically assign the second and third positions to the first and second traders 104 106 based on a first position in a first instrument held by the first trader 104 to which the second trader 106 is a counterparty. For example, the first instrument may include a interest rate derivative, the payment comprising a coupon payment, the first instrument may include an equity based derivatives contract, the payment comprising a dividend payment, the first instrument may include a foreign exchange spot contract, the payment comprising an interest rate differential payment, the first instrument may include interest rate swap, the payment comprising an interest payment, the first instrument may include a loan of collateral, the payment comprising an interest payment, the payment may include a transaction fee, or combinations thereof. Further, the first instrument may be an index futures contract, such as the Carry Adjusted Index Futures described above, the payment comprising the accrual finance charges associated therewith to mimic operation, i.e. the daily profit/loss outcome, of a Total Return Swap.

In one embodiment, the quantity of each of the one or more futures contracts may be 1, the payment processor 122 being further operative to assign the second and third positions in a plurality of the futures contract, the quantity of the plurality of the futures contract being determined based on the payment amount. For example, the value of the second and third positions as of the assignment may be zero wherein the predefined value is non-zero. Alternatively, the predefined value may be valued based on a multiplier and a final settlement value, wherein the multiplier may be 0.01, 0.10, 1.00, 10.00, 100.00, 1000.00, 10,000.00, or some other value.

In one embodiment, the value of the second and third positions as of the assignment may be non-zero, such as based on a multiplier and a final settlement value, and wherein the predefined value may be zero. The multiplier may include 0.01, 0.10, 1.00, 10.00, 100.00, 1000.00, 10,000.00, or some other value.

Figure 2:
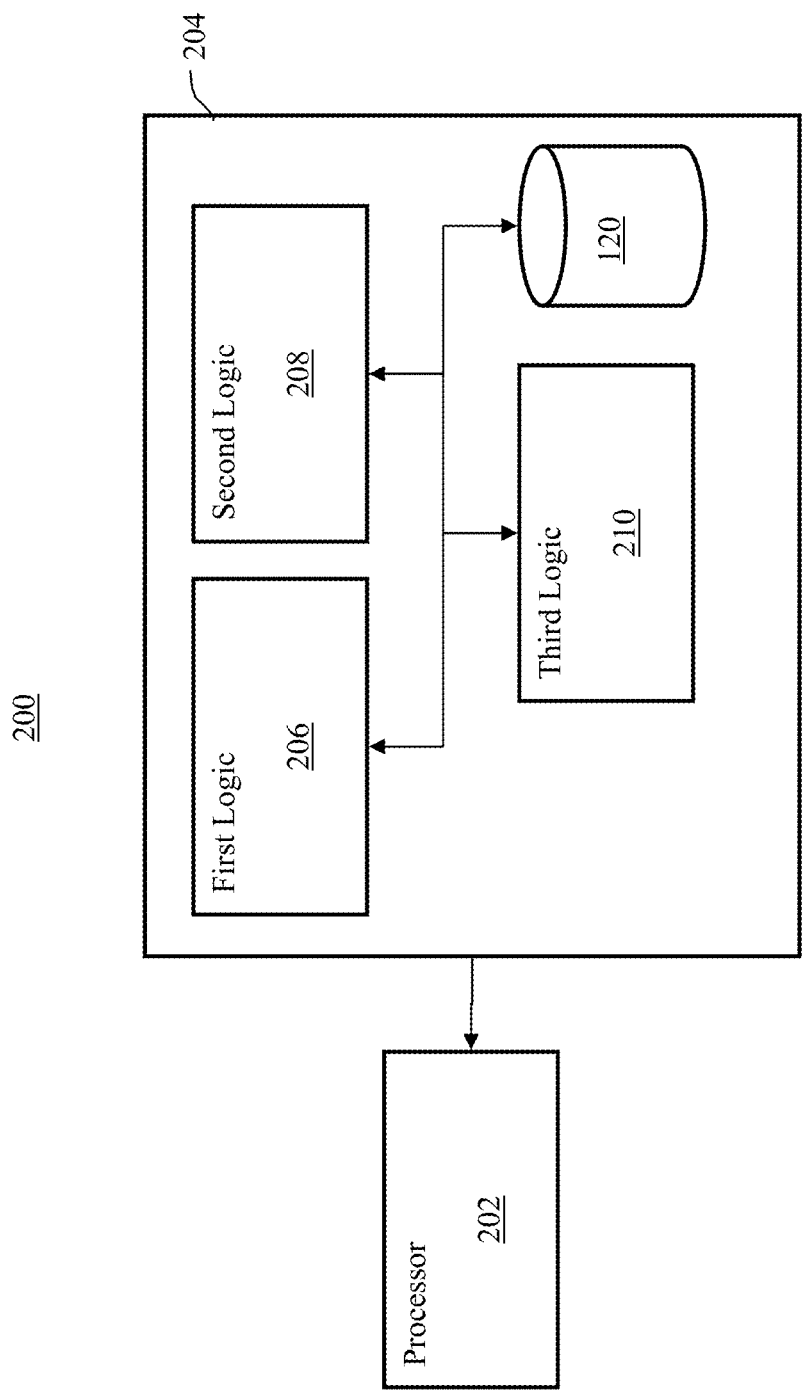
FIG. 2 a block diagram of an exemplary implementation of the system of FIG. 1 for facilitating payments between counterparties, e.g. first and second traders, by a central counterparty.
Figure 4:
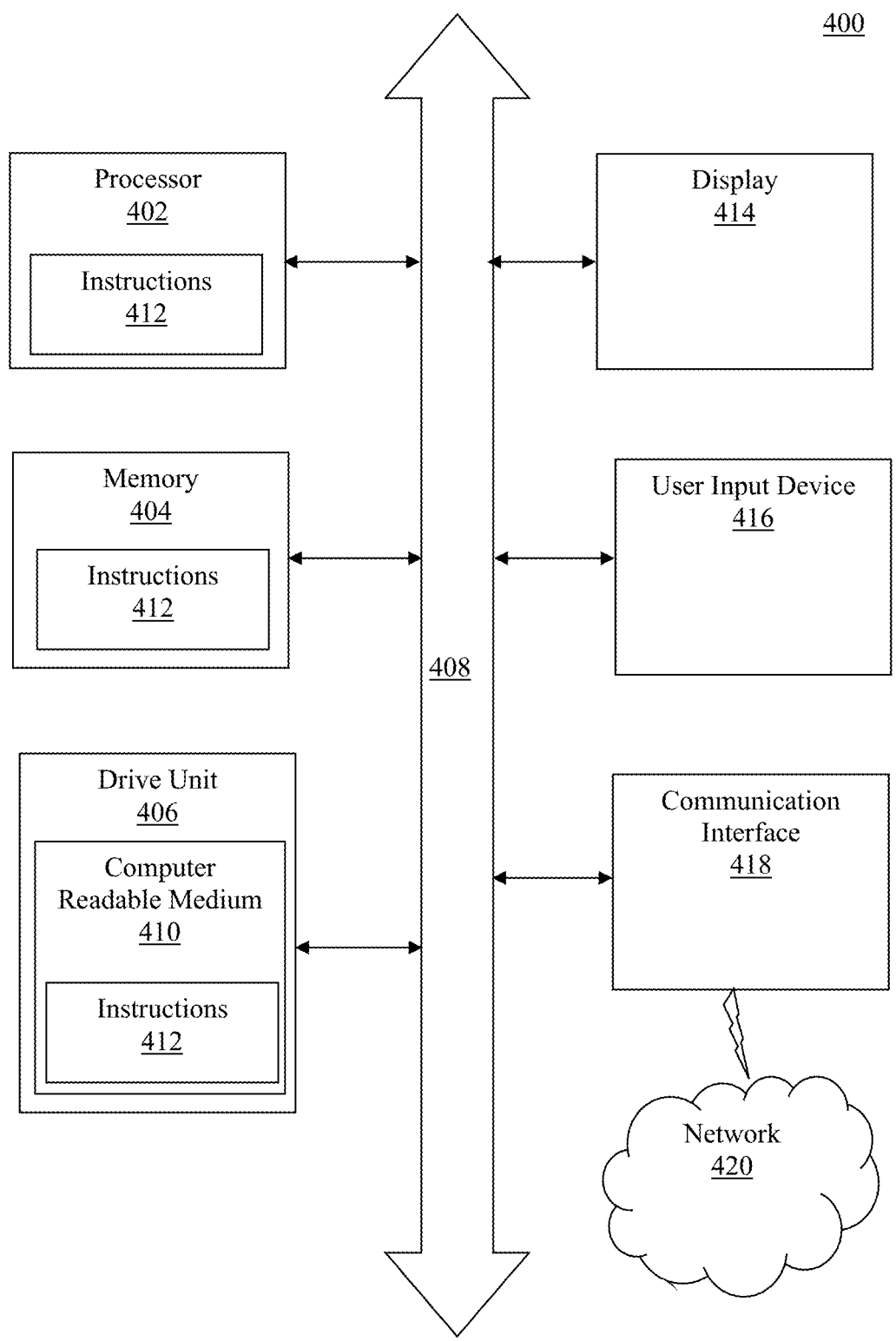
FIG. 4 shows an illustrative embodiment of a general computer system 400 for use with the system of FIG. 1.

Referring to FIG. 2, there is shown a block diagram of an exemplary implementation of the system 124 for facilitating payments between counterparties, e.g. first and second traders, by a central counterparty which requires the first and second traders to each maintain associated accounts in which funds are deposited to cover trading losses, the central counterparty comprising a processor 202 and a memory 204 coupled therewith, such as the processor 402 and memory 404 shown in FIG. 4 and described in more detail below. The system 124 includes an account database 120 stored in the memory 204, the account database 120 comprising a first account record associated with the first trader 104 which includes data reflecting funds maintained on account to cover trading losses by the first trader 104, and a second account record associated with the second trader 106 which includes data reflecting funds maintained on account to cover trading losses by the second trader 106. The system 124 further includes first logic 206 stored in the memory 204 and executable by processor 202 to determine the amount of a payment to be made from one of the first or second trader 104 106 to the other of the first or second trader 104 106 at one or more settlement dates, such as based on a first position in a first instrument held by the first trader to which the second trader is a counter-party or otherwise holds a counter-position. The first logic 206 may be further executable to assign the first trader 104 a second position in one or more futures contracts each characterized by the settlement date, a quantity and a price, the second position being characterized by a value based on the quantity and the price of each of the one or more futures contracts as of the assignment, and assign the second trader 106 a third position, counter to the first position, in the one or more futures contracts, the first and second traders 104 106 not being identified to each other.

As described above, the one or more futures contracts may comprise a single futures contracts with multiple, intermediate, settlements dates, each with a different settlement price, or may comprise multiple futures contracts each having a different final settlement date and final settlement price. For example, a single futures contract having a final settlement date of 1 year from creation, daily settlement and a settlement price which increments daily from zero by increments of 1/365 may be created. Alternatively, 365 futures contracts may be generated, each having a daily incremental settlement date and settlement value associated therewith which increments by 1/365 as compared to the previously settled futures contract. In the case of a single futures contract, it will be appreciated that the intermediate settlement dates may, in fact, be defined by the Exchange based on the Exchange's periodic calculation of variation margin for a given portfolio, e.g. daily.

The system 124 further includes second logic 208 stored in the memory 204 and executable by the processor 202 to value, upon occurrence of the settlement date, the futures contract at a predefined value different from the price of the futures contract, the difference being based on the determined payment amount.

In addition, the system 124 includes third logic 210 stored in the memory 204 and executable by the processor 202 to modify, e.g. periodically such as daily or on occurrence of each of the one or more settlement dates, the first and second account records in the account database to reflect a credit to the account of the first trader 104 and a debit from the account of the second trader 106 in the amount of the difference between the value of the second position and the predefined value when the difference represents a loss for the second trader 106, and modify the first and second account records in the account database to reflect a debit from the account of the first trader 104 and a credit to the account of the second trader 106 in the amount of the difference between the value of the second position and the predefined value when the difference represents a loss for the first trader 104.

Figure 3:
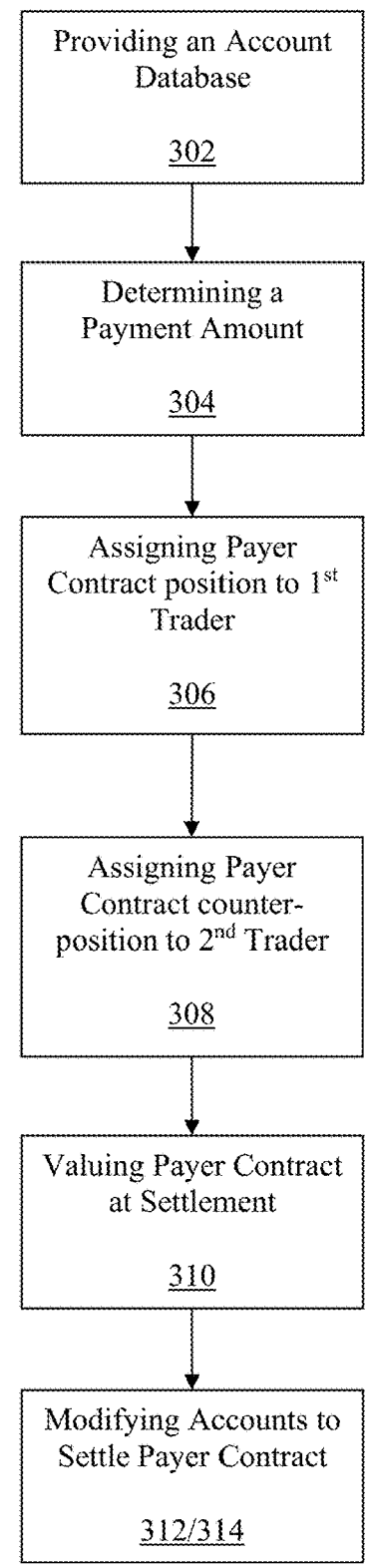
FIG. 3 depicts a flow chart showing operation of the system of FIGS. 1 and 2.

FIG. 3 depicts a flow chart showing operation of the system of FIGS. 1 and 2. In particular FIG. 3 shows a computer implemented method of facilitating one or more payments between a first trader and a second trader by a central counterparty which requires the first and second traders to each maintain associated accounts in which funds are deposited to cover trading losses, the central counterparty comprising a payment processor 122, a settlement processor 114, a margin processor 116, and a memory (not shown) such as the memory 404 of FIG. 4, coupled with the payment, settlement and margin processors 122 114 116. The method includes: providing, by the central counterparty, an account database stored in the memory, the account database comprising a first account record associated with the first trader which includes data reflecting funds maintained on account to cover trading losses by the first trader, and a second account record associated with the second trader which includes data reflecting funds maintained on account to cover trading losses by the second trader (block 302); determining, by the payment processor, the amount of a payment to be made from one of the first or second trader to the other of the first or second trader at one or more settlement dates (block 304), e.g. based on a first position in a first instrument held by the first trader to which the second trader is a counter-party or otherwise holds a counter-position, such as upon occurrence of each of the one or more settlement dates or prior thereto; assigning, by the payment processor, the first trader a second position in one or more futures contracts characterized by the one or more settlement dates, a quantity and a price, the second position being characterized by a value based on the quantity and the price of each of the one or more futures contracts as of the assigning (block 306); assigning, by the payment processor, the second trader a third position, counter to the second position, in the futures contract, the first and second traders not being identified to each other (block 308); valuing, by the settlement processor upon occurrence of each of the one or more settlement dates, each of the one or more futures contracts at a predefined value different from the price of the futures contract, the difference being based on the determined payment amount (block 310); modifying, by the margin processor, the first and second account records in the account database to reflect a credit to the account of the first trader and a debit from the account of the second trader in the amount of the difference between the value of the second position and the predefined value when the difference represents a loss for the second trader (block 312); and modifying, by the margin processor, the first and second account records in the account database to reflect a debit from the account of the first trader and a credit to the account of the second trader in the amount of the difference between the value of the second position and the predefined value when the difference represents a loss for the first trader (block 314).

In one embodiment, the assigning to the first and second traders is automatically performed by the central counterparty based on a first position in a first instrument held by the first trader to which the second trader is a counterparty. For example, the second instrument may include a interest rate derivative, the payment comprising a coupon payment, the second instrument may include an equity based derivatives contract, the payment comprising a dividend payment, the second instrument may include a foreign exchange spot contract, the payment comprising an interest rate differential payment, the second instrument may include interest rate swap, the payment comprising an interest payment, the second instrument may include a loan of collateral, the payment comprising an interest payment, the payment may include a transaction fee, or combinations thereof. Further, the first instrument may be an index futures contract, such as the Carry Adjusted Index Futures described above, the payment comprising the accrual finance charges associated therewith to mimic operation of a Total Return Swap.

In one embodiment, the quantity of futures contract may be 1, the assigning of the second and third positions to the first and second traders respectively, further comprising assigning the second and third positions in a plurality of the futures contract, the quantity of the plurality of the futures contract being determined based on the payment amount.

In one embodiment, the value of the second and third positions as of the assigning may be zero and the predefined value may be non-zero, such as based on a multiplier and a final settlement value. The multiplier may include 0.01, 0.10, 1.00, 10.00, 100.00, 1000.00, 10,000.00, or other value.

In embodiment, the value of the second and third positions as of the assigning may be non-zero wherein the predefined value is zero. The value of the second and third positions may be based on a multiplier and a final settlement value where the multiplier may be 0.01, 0.10, 1.00, 10.00, 100.00, 1000.00, 10,000.00 or another value.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

We claim:

1. A computer implemented method of facilitating a plurality of payments between traders based on a first position in a first instrument held by a first trader to which a second trader is a counterparty, the method comprising:
   determining, by a payment processor based on the first position, the amount of each of the plurality of payments to be made from one of the first or second trader to the other of the first or second trader in advance of settlement thereof;
   assigning, automatically by the payment processor based on the first position in the first instrument held by the first trader to which the second trader is a counterparty, a second position to the first trader in one or more futures contracts each characterized by one or more settlement dates, one or more settlement prices, and a quantity, and a third position to the second trader, counter to the second position, in the futures contract, the first and second traders not being identified to each other;

valuing, by a settlement processor upon occurrence of each of the one or more settlement dates, each of the one or more futures contracts at a value different from the associated settlement price of the futures contract, the value being based on the determined payment amount and the associated settlement price of the futures contract; and modifying, by a margin processor, a first account record associated with the first trader and a second account record associated with the second trader, both stored in an account database stored in a memory coupled with the processor, to reflect a credit to the account of the first trader and a debit from the account of the second trader in the amount of the difference between the value of the second position and the value when the difference represents a loss for the second trader or to reflect a debit from the account of the first trader and a credit to the account of the second trader in the amount of the difference between the value of the second position and the value when the difference represents a loss for the first trader.

2. The computer implemented method of claim 1 wherein the first instrument comprises a carry adjusted index futures contract, the plurality of payments comprising accrued financing charges associated therewith.

3. The computer implemented method of claim 1 wherein the one or more futures contracts comprises one contract having a plurality of different settlement dates.

4. The computer implemented method of claim 1 wherein the one or more futures contracts comprises a plurality of futures contracts, each having a different settlement date.

5. The computer implemented method of claim 1 wherein the settlement price associated with each settlement date is incrementally increased over the settlement price associated with a prior settlement date.

6. The computer implemented method of claim 1 wherein the quantity of each of the one or more futures contracts is one, the assigning of the second and third positions to the first and second traders respectively, further comprising assigning the second and third positions in a plurality of the futures contracts, the quantity of the plurality of the futures contract being determined based on the payment amount.

7. The computer implemented method of claim 1 wherein the value of the second and third positions as of the assigning is one of zero or non-zero.

8. The computer implemented method of claim 7 wherein the value is one of zero or non-zero.

9. The computer implemented method of claim 7 wherein the value is valued based on a multiplier and a final settlement value.

10. The computer implemented method of claim 9 wherein the multiplier comprises a value selected from the group comprising 0.01, 0.10, 1.00, 10.00, 100.00, 1000.00, 10,000.0.

11. The computer implemented method of claim 1 wherein the determining of the payment amount occurs upon occurrence of each of the settlement dates.

12. A system for facilitating a plurality of payments between traders based on a first position in a first instrument held by a first trader to which a second trader is a counterparty, the system comprising:

a payment processor coupled with a memory and operative to determine, based on the first position, the amount of each of the plurality of payments to be made from one of the first or second trader to the other of the first or second trader in advance of settlement thereof; and wherein the payment processor is further operative to automatically assign, based on the first position in the first instrument held by the first trader to which the second trader is a counterparty, a second position to the first trader in one or more futures contracts each characterized by one or more settlement dates, one or more settlement prices, and a quantity, the first position being characterized by a value based on the quantity and the one or more settlement prices of each of the one or more futures contracts as of the assignment, and automatically assign a third position to the second trader, counter to the second position, in the futures contract, the first and second traders not being identified to each other;

a settlement processor coupled with the memory and operative to value, upon occurrence of each of the one or more settlement dates, each of the one or more futures contracts at a value different from the associated settlement price of the futures contract, the value being based on the determined payment amount and the associated settlement price of the futures contract; and a margin processor coupled with the settlement processor and the memory and operative to modify a first account record associated with the first trader and a second account record associated with a second trader, both stored in an account database stored in the memory, to reflect a credit to the account of the first trader and a debit from the account of the second trader in the amount of the difference between the value of the second position and the value when the difference represents a loss for the second trader, or to reflect a debit from the account of the first trader and a credit to the account of the second trader in the amount of the difference between the value of the second position and the value when the difference represents a loss for the first trader.

13. The system of claim 12 wherein the first instrument comprises a carry adjusted index futures contract, the plurality of payments comprising accrued financing charges associated therewith.

14. The system of claim 12 wherein the one or more futures contracts comprises one contract having a plurality of different settlement dates.

15. The system of claim 12 wherein the one or more futures contracts comprises a plurality of futures contracts, each having a different settlement date.

16. The system of claim 12 wherein the settlement price associated with each settlement date is incrementally increased over the settlement price associated with a prior settlement date.

17. The system of claim 12 wherein the quantity of each of the one or more futures contracts is one, the payment processor being further operative to assign the second and third positions in a plurality of the futures contract, the quantity of the plurality of the futures contract being determined based on the payment amount.

18. The system of claim 12 wherein the value of the first and second positions as of the assignment is one of zero or non-zero.

19. The system of claim 18 wherein the value is one of zero or non-zero.

20. The system of claim 18 wherein the value is valued based on a multiplier and a final settlement value.

21. The system of claim 20 wherein the multiplier comprises a value selected from the group comprising 0.01, 0.10, 1.00, 10.00, 100.00, 1000.00, 10,000.00.

22. The system of claim 12 wherein the payment processor is operative to determine the payment amount upon occurrence of the settlement date.

23. A system for facilitating a plurality of payments between traders based on a first position in a first instrument held by a first trader to which a second trader is a counterparty, the system comprising:

first logic stored in a memory and executable by a processor to determine, based on the first position, the amount of each of the plurality of payments to be made from one of the first or second trader to the other of the first or second trader in advance of settlement thereof;

the first logic being further executable to automatically assign, based on the first position in the first instrument held by the first trader to which the second trader is a counterparty, a second position to the first trader in one or more futures contracts each characterized by one or more settlement dates, one or more settlement prices, and a quantity, the second position being characterized by a value based on the quantity and the one or more settlement prices of the one or more futures contracts as of the assignment, and a third position to the second trader, counter to the second position, in the futures contract, the first and second traders not being identified to each other;

second logic stored in the memory and executable by the processor to value, upon occurrence of each of the one or more settlement dates, each of the one or more futures contracts at a value different from the associated settlement price of the futures contract, the value being based on the determined payment amount and the associated settlement price of the futures contract; and third logic stored in the memory and executable by the processor to modify a first account record associated with the first trader and a second account record associated with the second trader, both stored in an account database stored in the memory, to reflect a credit to the account of the first trader and a debit from the account of the second trader in the amount of the difference between the value of the second position and the value when the difference represents a loss for the second trader, or to reflect a debit from the account of the first trader and a credit to the account of the second trader in the amount of the difference between the value of the second position and the value when the difference represents a loss for the first trader.

\* \* \* \* \*